Feb. 5, 1924.

V. L. EWAN 1,482,430

TRACTION ATTACHMENT FOR TRACTOR WHEELS

Filed March 8, 1922

Inventor
Virgil L. Ewan,
By
Attorney

Patented Feb. 5, 1924.

1,482,430

UNITED STATES PATENT OFFICE.

VIRGIL L. EWAN, OF FLEMINGSBURG, KENTUCKY.

TRACTION ATTACHMENT FOR TRACTOR WHEELS.

Application filed March 8, 1922. Serial No. 542,049.

*To all whom it may concern:*

Be it known that I, VIRGIL L. EWAN, a citizen of United States of America, and resident of Flemingsburg, in the county of Fleming and State of Kentucky, have invented certain new and useful Improvements in Traction Attachments for Tractor Wheels, of which the following is a specification.

This invention relates to tractor wheels, and particularly to a detachable non-skid or resistance attachment whereby the said wheel will offer a greater resistance to the elements in which it is partially imbedded while the tractor is being driven.

The invention relates more particularly to detachable mud flanges or cleats which will increase the tractional effect of the wheel and enable it to prove effective in soft roadbeds or while traveling over tilled ground.

It is an object of this invention to provide novel means for increasing the tractional effect of the wheel by devices that may be readily applied to or removed from the wheel in order that the said wheel will be adapted for use under different weather and road conditions.

It is, of course, undesirable and in certain States unlawful for a tractor to be provided with cleats as they have injurious effect on roads, but at other times it becomes necessary to provide some means for effecting resistance. On account of the foregoing conditions, this device will prove desirable as it will enable an operator to speedily provide tractor wheels with cleats, and they can be as readily removed when the surface conditions do not warrant their use.

It is a further object of this invention to provide novel means for securing the cleat bearing attachments to the wheel, while at the same time, providing means to prevent creeping or movement of the said cleats with respect to the tire or periphery of the wheel.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1:
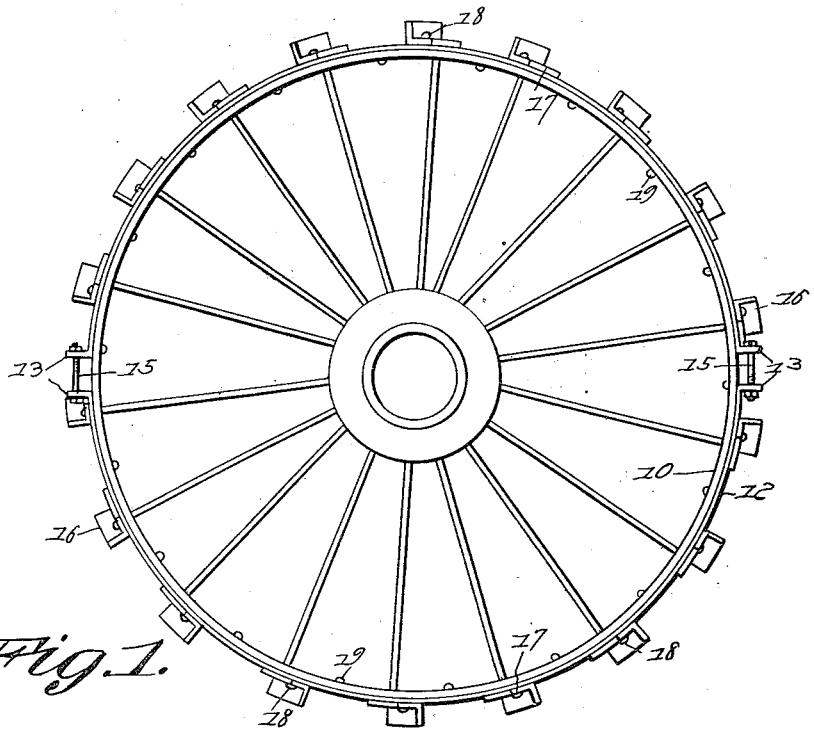
Figure 1 illustrates a view in elevation of a tractor wheel with a device embodying the invention applied thereto.
Figure 2:
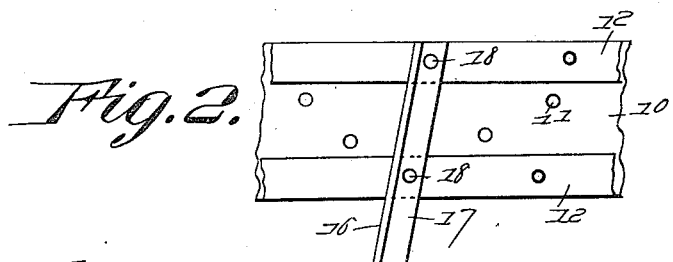
Figure 2 illustrates an external view of a fragment of the wheel with a fragment of the device in place.
Figure 3:
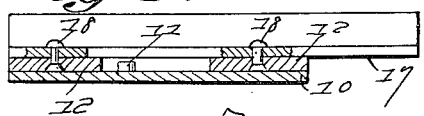
Figure 3 illustrates a transverse sectional view thereof.
Figure 4:
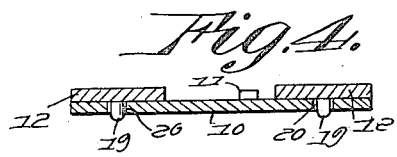
Figure 4 illustrates a sectional view with with the cleat omitted.
Figure 5:
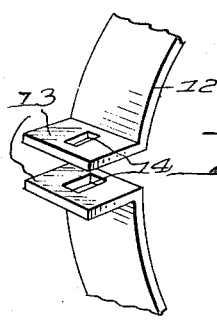
Figure 5 illustrates a detailed perspective view of the means for connecting the ends of the cleat carrying elements.

In these drawings 10 denotes the usual rim or tire of a tractor provided with studs 11, or such other traction augmenting devices as are usually employed on wheels of this kind. The attachment comprising this invention consists in part of approximately semi-circular plates or bands 12, adapted to be applied to the periphery of the wheel, and the adjacent ends of the bands have angularly disposed outward projecting portions 13 provided with slots 14 adapted to receive a fastening such as a bolt 15. As shown in Fig. 1, the semi-circular sections are connected together at each side of the wheel, although under certain conditions of use, a single joint could be employed for connecting the ends of the band that extended all the way around the wheel. Two bands 12 are employed, one of which is applied to the periphery of the wheel near an edge, and the space between the two bands is spanned by a plurality of angular cleats 16 having bases 17 attached to the bands by fastenings 18 such as rivets. The bands are further provided with studs 19 that enter apertures 20 in the rim or tire of the wheel and these studs are relied upon to prevent creeping of the bands with relation to the wheel. The cleats are shown as extending beyond the edge of the wheel and they can, of course, be made of any appropriate proportions to suit particular requirements.

It will be seen from the foregoing that by the removal of the bolts 15, the traction device can be removed from the wheel, and it can, of course, be as readily applied, whereas in the use of those devices employing spurs or lugs with threaded shanks, a nut must be removed on each of the shanks before the traction device is cleared of the wheel.

I claim:

1. In a traction attachment for tractor wheels, a pair of spaced semi-circular elements which are adapted to embrace the periphery of a wheel at the edges thereof, means for securing the ends of each of the elements together, cleats each of which extends across the two elements, with means for attaching the cleats to the elements, and means for preventing creeping of the elements relative to the wheel.

2. In a traction attachment for tractor wheels, a plurality of elements adapted to substantially encircle a wheel, means for clamping the elements on the wheel, cleats extending from one element to the other and secured thereto to hold the several elements in spaced relation to each other, studs on the said elements adapted to enter apertures in the tire of a wheel to prevent in use the creeping of the said elements.

3. In a traction attachment for tractor wheels, two pairs of semi-circular bands adapted to embrace the periphery of a wheel, the bands of each pair being at opposite edges of the wheel, means for securing the bands spaced to occupy when in use positions adjacent to each edge of the wheel, cleats extending from one band to the other and anchored thereto to hold the bands in spaced relation relative to the width of the rim of the tractor wheel, studs on the bands extending inwardly, and a wheel having apertures in its rim to receive the said studs.

4. A traction attachment for wheels comprising a pair of tractor elements, each element thereof comprising a pair of semi-circular members having outstanding ends with apertures therethrough, angular cleats secured to the members and holding the same in spaced relation, and means for connecting the outstanding ends of alined members to each other.

5. A tractor wheel having a flat rim with apertures, in combination with removable semi-circular members having studs which project from the concave faces of said members and register with the apertures of the rim, cleats attached to the convex faces of the semi-circular members, and means for connecting the adjacent ends of said members to the rim of the tractor wheel.

VIRGIL L. EWAN.